(12) United States Patent
Ge et al.

(10) Patent No.: US 12,476,534 B2
(45) Date of Patent: Nov. 18, 2025

(54) CASCADED RESONANT SWITCHED-CAPACITOR POWER CONVERTER

(71) Applicant: THE REGENTS OF THE UNIVERSITY OF CALIFORNIA, Oakland, CA (US)

(72) Inventors: Ting Ge, Union City, CA (US); Zichao Ye, Santa Clara, CA (US); Robert C.N. Pilawa-Podgurski, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 246 days.

(21) Appl. No.: 18/201,641

(22) Filed: May 24, 2023

(65) Prior Publication Data

US 2023/0396144 A1 Dec. 7, 2023

Related U.S. Application Data

(60) Provisional application No. 63/350,014, filed on Jun. 7, 2022.

(51) Int. Cl.
*H02M 3/07* (2006.01)
*H02M 1/00* (2006.01)
*H02M 3/00* (2006.01)

(52) U.S. Cl.
CPC ............ *H02M 1/007* (2021.05); *H02M 3/01* (2021.05); *H02M 3/07* (2013.01)

(58) Field of Classification Search
CPC ........... H02M 3/07–078; H02M 1/007; H02M 1/0077
See application file for complete search history.

(56) References Cited

U.S. PATENT DOCUMENTS 7,746,041 B2    6/2010  Xu
10,374,511 B2 *  8/2019  Salem ................... H02M 3/07
(Continued)

OTHER PUBLICATIONS

C. Schaef, B. Reese, C. R. Sullivan and J. T. Stauth, "Design aspects of multi-phase interleaved resonant switched-capacitor converters with mm-scale air-core inductors," 2015 IEEE 16th Workshop on Control and Modeling for Power Electronics (COMPEL), Vancouver, BC, Canada, 2015, pp. 1-5, (Year: 2015).*

(Continued)

*Primary Examiner* — Peter M Novak
(74) *Attorney, Agent, or Firm* — O'BANION & RITCHEY LLP; John P. O'Banion

(57) ABSTRACT

A cascaded power converter architecture is provided which merges a front end stage with subsequent interleaved Switched Capacitor (SC) stages to achieve high conversion ratios. This interleaving control technique addresses practical conversion challenges. Numerous topologies can be created from this approach, a number of examples being depicted, including: (a) a two stage 4-to-1 conversion using two 2-to-1 ReSc converter stages, and (b) 8-to-1 converters with (b)(i) a 2-to-1 ReSC stage followed by a $2^{nd}$ stage having four 4-to-1 STC converter phases, (b)(ii) a 2-to-1 ReSC $1^{st}$ stage followed by a $2^{nd}$ stage with four 4-to-1 series-parallel phases, and (c) a multi-stage cascading three stage converter with a 2-to-1 ReSC $1^{st}$ stage, a $2^{nd}$ stage of two 2-to-1 ReSC phases, and a $3^{rd}$ stage having four 2-to-1 ReSC phases.

23 Claims, 13 Drawing Sheets

(56) References Cited

U.S. PATENT DOCUMENTS

2022/0190714 A1* 6/2022 Ye .......................... H02M 3/07
2023/0353054 A1* 11/2023 Hardy ................ H02M 3/1584

OTHER PUBLICATIONS

Shehabi, Arman et al., "United states data center energy usage report," Lawrence Berkeley National Laboratory, Berkeley, CA, Tech.Rep. LBNL-1005775, Jun. 2016. [Online]. Available: https://datacenters.lbl.gov/sites/default/files/DCDWebscale Shehabi 072016.pdf.

Li, Xin et al., "Google 48V Rack Adaptation and Onboard Power Technology Update," in Open Compute Project (OCP) 2019 Summit, Mar. 14-15, 2019.

Reusch, David et al., "System optimization of a high power density non-isolated intermediate bus converter for 48 v server applications," in 2018 IEEE Applied Power Electronics Conference and Exposition (APEC), Mar. 2018, pp. 2191-2197.

Ahmed, Mohamed et al., "GaN Based High-Density Unregulated 48 V to x V LLC Converters with ??? 98% Efficiency for Future Data Centers," PCIM Europe 2019; International Exhibition and Conference for Power Electronics, Intelligent Motion, Renewable Energy and Energy Management, 2019, pp. 1-8.

Makowski, Marek S. et al., "Performance limits of switched-capacitor dc-dc . converters," in Power Electronics Specialists Conference, 1995. PESC '95 Record., 26th Annual IEEE, vol. 2, Jun. 1995, pp. 1215-1221.

Henry, Jordan et al., "Practical performance analysis of complex switched-capacitor converters," IEEE Transactions on Power Electronics, vol. 26, No. 1, pp. 127-136, Jan. 2011.

Pascual, Cesar et al. "Switched capacitor system for automatic series battery equalization," in Proceedings of APEC 97—Applied Power Electronics Conference, vol. 2, Feb. 1997, pp. 848-854.

Linear Technology, LTC7820 Data Sheet, 2017. [Online]. Available: http://cds.linear.com/docs/en/datasheet/7820fb.pdf.

Webb, Samuel et al., "A zero inductor-voltage 48v to 12v/70a converter for data centers with 99.1% peak efficiency and 2.5kw/in3 power density," in 2020 IEEE Applied Power Electronics Conference and Exposition (APEC), 2020, pp. 1858-1865.

Ye, Zichao et al., "The cascaded resonant converter: A hybrid switched-capacitor topology with high power density and efficiency," IEEE Transactions on Power Electronics, vol. 35, No. 5, 2020, pp. 4946-4958.

Lyu, X et al., "Comparison of gan based switched-tank converter and cascaded voltage divider," in 2017 IEEE 5th Workshop on Wide Bandgap Power Devices and Applications (WiPDA), 2017, pp. 158-164.

* cited by examiner

ZCS operation

ZVS operation 1

ZVS operation 2

CASCADED RESONANT SWITCHED-CAPACITOR POWER CONVERTER

CROSS-REFERENCE TO RELATED APPLICATIONS

This application claims priority to, and the benefit of, U.S. provisional patent application Ser. No. 63/350,014 filed on Jun. 7, 2022, incorporated herein by reference in its entirety.

STATEMENT REGARDING FEDERALLY SPONSORED RESEARCH OR DEVELOPMENT

This invention was made with Government support under Award Number DE-AR0000906, awarded by the U.S. Department of Energy, Advanced Research Projects Agency-Energy (ARPA-E). The Government has certain rights in the invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to low voltage electrical power conversion, and more particularly to switched capacitor voltage conversion devices.

2. Background Discussion

Toward fulfilling the rising demand for internet and computing resources, servers and data centers require increasing levels of power consumption. To address the issue of high distribution loss on the bus bar of server racks, a 48 V bus architecture has been proposed and is expected to be used for next-generation data centers.

However, there are numerous considerations, such as efficiency and infrastructure reuse, with the conversion of this 48 V bus to the lower voltages required at the point of load.

Accordingly, a need exists for enhanced electrical power conversion strategies which increase efficiency and power density for non-isolated DC-DC power conversion. The present invention fulfills those needs and provides additional benefits.

BRIEF SUMMARY

A 48-to-12 V bus converter for data center applications is disclosed. The technology can achieve 99.0% peak efficiency, 98.0% full-load efficiency, and 4068 W/in³ power density, both of which were found to be the highest in existing reported works. Besides data center applications, the technology can also be expanded for higher conversion ratios (e.g., 8-to-1), or operated in the reverse direction for voltage step-up. Other possible applications that can potentially be benefited from this technology include, but are not limited to, portable electronics, electric vehicles and solar photovoltaics.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

1. Introduction

Figure 1:
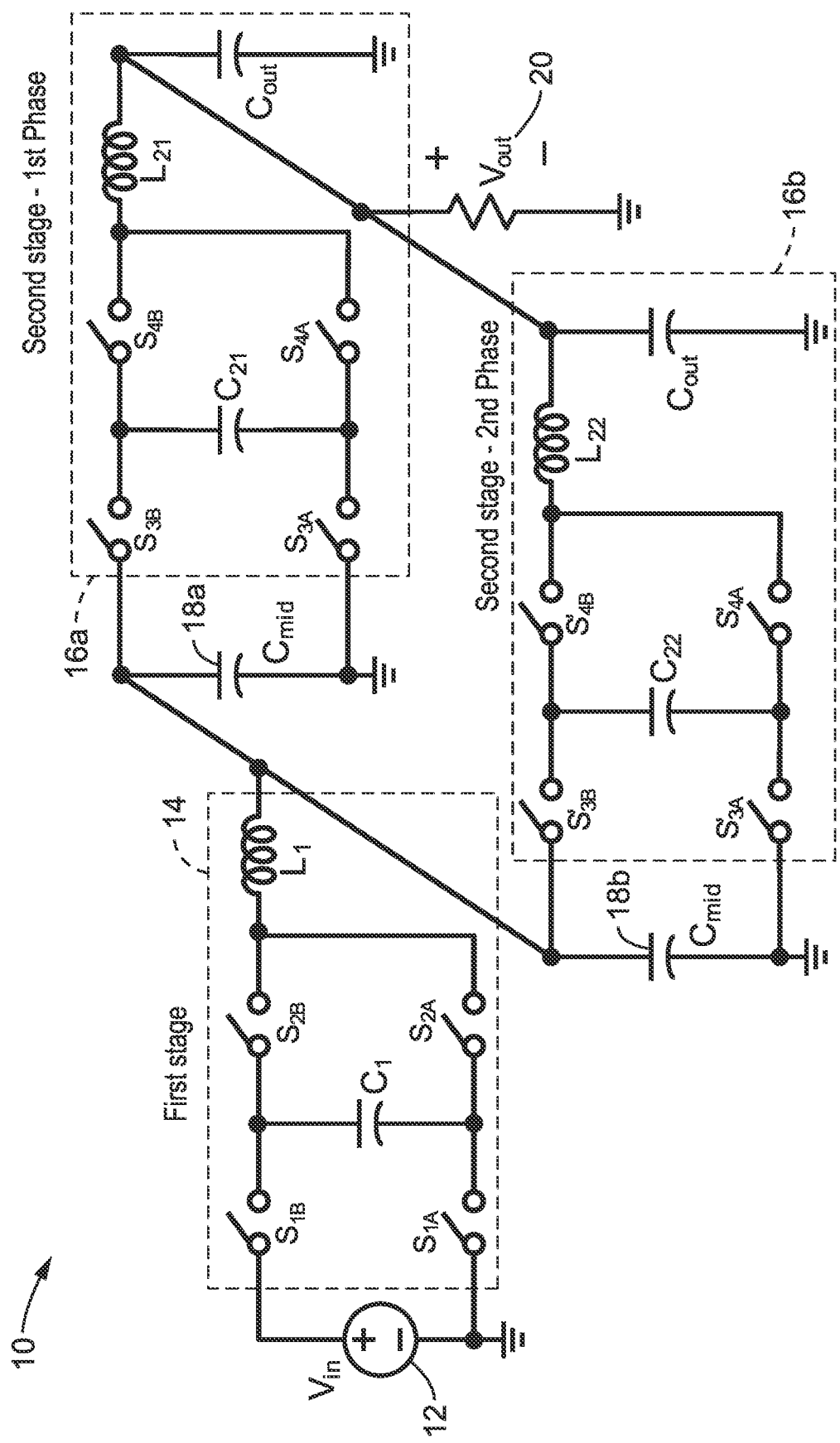
FIG. 1 is a schematic diagram of an embodiment of a Cascaded Resonant Switched-Capacitor (ReSC) converter according to at least one embodiment of the present disclosure.

One important research area for adopting a 48 V bus architecture is stepping down from 48 V to the Point-of- Load (PoL) voltage, which is usually implemented by an intermediate bus converter followed by a voltage regulator (VR), with the benefits of high efficiency and reutilization of 12 V legacy systems.

Numerous topologies have been explored for use in 48-to-12 V intermediate bus applications. The inductor-based converters, such as buck converters, have limited power density since the inductors dominate the size of the overall solution. Shrinking the inductor size compromises efficiency when the switching frequency is pushed too high. The LLC (inductor inductor capacitor) converter is another mature magnetic-based topology and has good performances in both efficiency and power density, but has the drawbacks of complicated transformer design, limited scalability, and high cost.

Since capacitors can achieve higher energy densities compared with inductors, switched-capacitor (SC) based converters have the potential to achieve higher power density and have gained increasing attention in performance-driven applications. The 2-to-1 SC converter can achieve high levels of power density and efficiency for 48-to-24 V power conversion. Multiple 2-to-1 SC converters can be cascaded to realize higher-ratio conversion. The cascaded SC converter of the present disclosure further improves performance through the use of resonant inductors, wherein this new topology is referred to herein as a cascaded resonant switched-capacitor converter (ReSC).

The flying capacitors are soft charged, so the capacitor charge redistribution loss is eliminated. The resonance between flying capacitors and inductors enables soft switching for all MOSFETs, so the switching loss can be minimized. Both the soft charging and soft switching are beneficial for efficiency. Another advantage of the cascaded resonant converter is the effective utilization of passive components, which can provide higher levels of power density. Multiple phases of cascaded resonant converters can be paralleled to further improve the current-handling capability.

Specifically, a cascaded architecture is utilized with a merged front stage and interleaved following stage(s) that are implemented on a switched-capacitor converter to achieve high conversion ratio efficiently. An interleaving-based control technique is adopted to address associated practical challenges. Power converters based on this architecture can be adopted to improve the energy efficiency of the fast growing area of data centers, and other power conversion applications exemplified by way of example, and not limitation, as: (1) data center power delivery (48/12V) technologies in supporting rapidly increasing power demands; (2) all-electric and hybrid vehicle technologies for bridging 48V distribution and legacy 12V legacy subsystems; (3) portable electronic technologies for enabling more efficient and more rapid wired and wireless charging; and (4) solar photovoltaic technologies toward improving conversion efficiency between panel and grid.

2. Embodiments of the Present Disclosure

FIG. 1 illustrates an example embodiment 10 of a converter having a single-phase 2-to-1 resonant switched-capacitor (ReSC) circuit 14, cascaded with a second stage having two phases 16a and 16b of interleaved 2-to-1 ReSC circuitry to realize a total 4-to-1 conversion ratio.

The converter architecture inherits a simple structure and operating principles of its fundamental 2-to-1 element and has the potential to achieve dramatic efficiency and power density improvement over state-of-the-art approaches.

The first stage uses only one phase to reduce the space of active components, which has considerable practical advantages in terms of reduction in PCB layout area, and number of level shifters and gate drivers. The magnetic volume is also benefited since only one inductor is used in the first stage. Outputs from the switching paths are coupled through inductor $L_1$ for coupling to the second stage and its intermediate capacitance $C_{mid}$, depicted as capacitors 18a, 18b, connected respectively to each phase of this second stage. It should be noted that the figures depict the overall operating effect of each element of the circuit; accordingly, each capacitor represents an amount of capacitance which in practice can be achieved by any desired combination of series, parallel or series-parallel capacitances; this understanding also applies to the inductors shown. Similarly, each switch shown in the figure can be performed using parallel switches operating synchronously.

Another advantage of this converter is the significantly reduced size of the intermediate capacitance $C_{mid}$ between the first and second stages. The second stage has multiple phases and operates in an interleaving manner, such that the input current of the second stage matches the output current of the first stage. Therefore, instead of using a sufficiently large $C_{mid}$ to completely decouple the first stage and second stage, a small $C_{mid}$ can be chosen to reduce passive volume while maintaining circuit performance. It should be noted that $C_{mid}$ cannot be omitted, and a small $C_{mid}$ is still required since it acts as a decoupling capacitor for the second stage input. $C_{mid}$ should be configured so as to prevent it from resonating with the first-stage and second-stage inductors and flying capacitors.

In particular, the first stage is shown receiving power input 12 of $V_{in}$ (e.g., 48 V) which is directed to a switched capacitor matrix with switches $S_{1B}$ and $S_{2B}$ coupled to the positive input, and switches $S_{1A}$ and $S_{2A}$ coupled to the negative input. Coupled between switches $S_{1B}$ and $S_{2B}$ and switches $S_{1B}$ and $S_{2B}$, is seen capacitor $C_1$, these often being referred to as a flying capacitor.

In the first phase 16a of the second stage, a capacitor $C_{mid}$ 18 is shown between the input received from the first stage 14 and ground, the remainder can have the same structure as the first stage with a first switch path having switches $S_{3B}$ and $S_{4B}$ and a second switch path having switches $S_{3A}$ and $S_{4A}$. A capacitor $C_{21}$ is shown between switch pair $S_{3A}$, $S_{3B}$ and $S_{4A}$ and $S_{4B}$, with the output directed through inductor $L_{21}$ to output capacitor $C_{out}$ at the output load $V_{out}$ 20. The second phase 16b of this second stage has the same structure as the first phase and is shown with switches $S'_{3A}$, $S'_{3B}$, $S'_{4A}$, and $S'_{4B}$, and capacitors $C_{22}$ and $C_{out}$.

Figure 2:
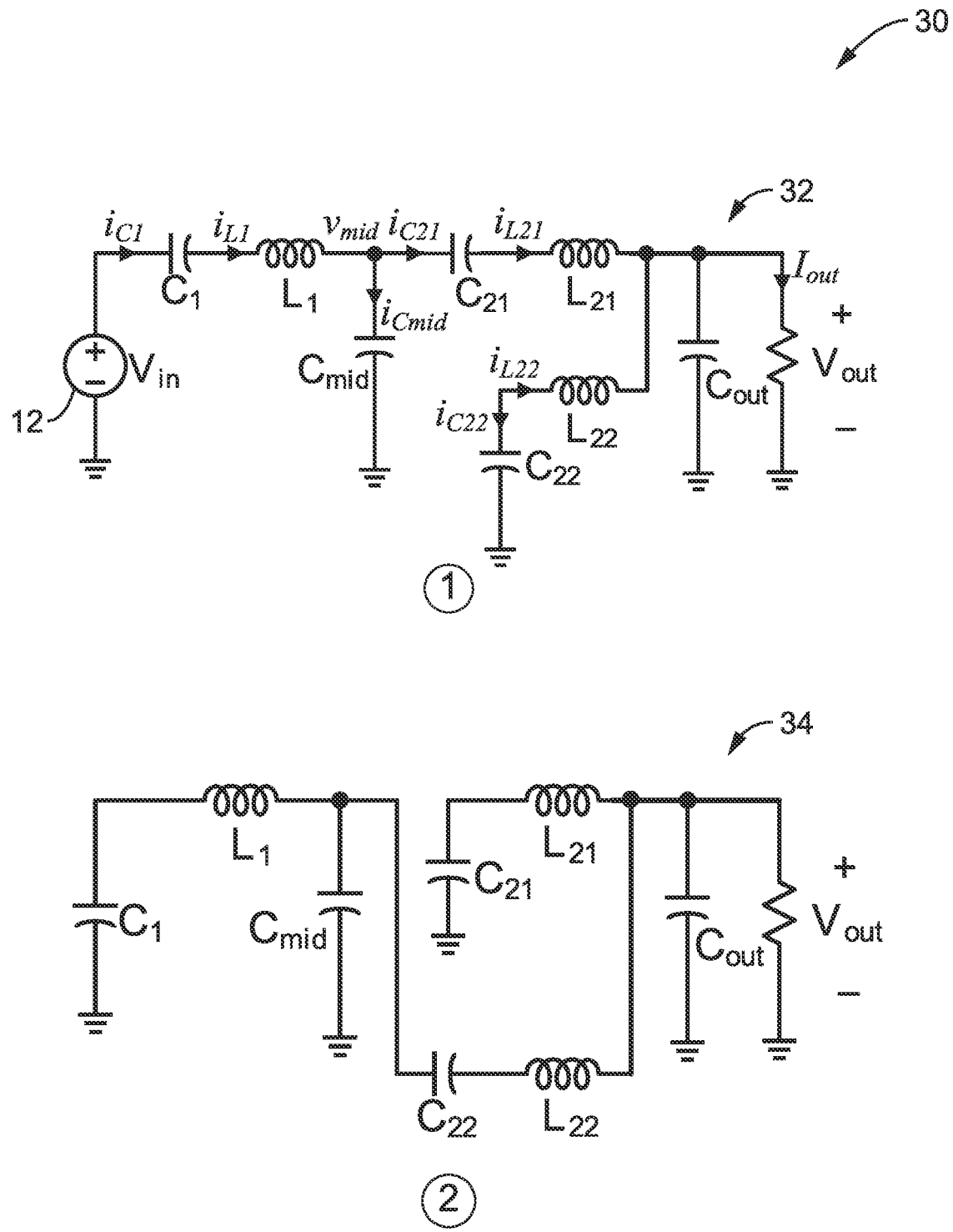
FIG. 2 is a schematic of the two operation states of the 4:1 ReSC converter circuit of FIG. 1, according to at least one embodiment of the present disclosure.

FIG. 2 illustrates an example embodiment 30 showing the two operating cycles of the circuit in FIG. 1. In order to achieve ultra-efficient and fixed-ratio power conversion, in at least one embodiment, all MOSFETs in this converter operate with the same switching frequency and a 50% duty cycle.

In one half cycle of the period as shown in the upper diagram 32, the LC tank of $C_1 L_1$ of the first stage is in series with the resonant tank of $C_{21}$ and $L_{21}$. It should be noticed that the current through $L_1$ matches the current through $L_{21}$, so only a small amount of current $i_{Cmid}$ passes through $C_{mid}$. One terminal of the LC tank of $C_{22}L_{22}$ is connected to ground, and the other terminal is connected to the output.

In the other half cycle of the period as shown in the lower diagram, the operation modes of the second-stage resonant tanks are swapped. The branch of $C_{22}$ and $L_{22}$ are in series with $C_1$ and $L_1$, and the other branch, $C_{21}$ and $L_{21}$, is charging $V_{out}$.

The first stage tank $C_1L_1$ is in series with $C_{21}L_{21}$ tank for a half switching period and is in series with $C_{22}L_{22}$ tank for the other half switching period. The operating conditions of the $C_{21}$ $L_{21}$ tank and the $C_{22}L_{22}$ tank are swapped periodically. Another important feature of the interleaving operation of the second stage two phases is that the inductor current waveforms of $i_{L21}$ and $i_{L22}$ have 180 degree phase shift. Furthermore, since the three tanks of $C_1L_1$, $C_{21}L_{21}$, and $C_{22}L_{22}$ have the same resonant frequency, the inductor currents $i_{L21}$ and $i_{L22}$ are symmetrical and have the same waveform. The nominal switching frequency is the resonant frequency of the flying capacitor and the inductor $$\left( f_{sw} = \frac{1}{2\pi\sqrt{L_1 C_1}} = \frac{1}{2\pi\sqrt{L_2 C_2}} \right),$$

as it is the minimum frequency for soft switching with low conduction loss. The flying capacitors are resonantly charged in one state and discharged in the other state, resulting in no charge-redistribution loss.

Figure 3:
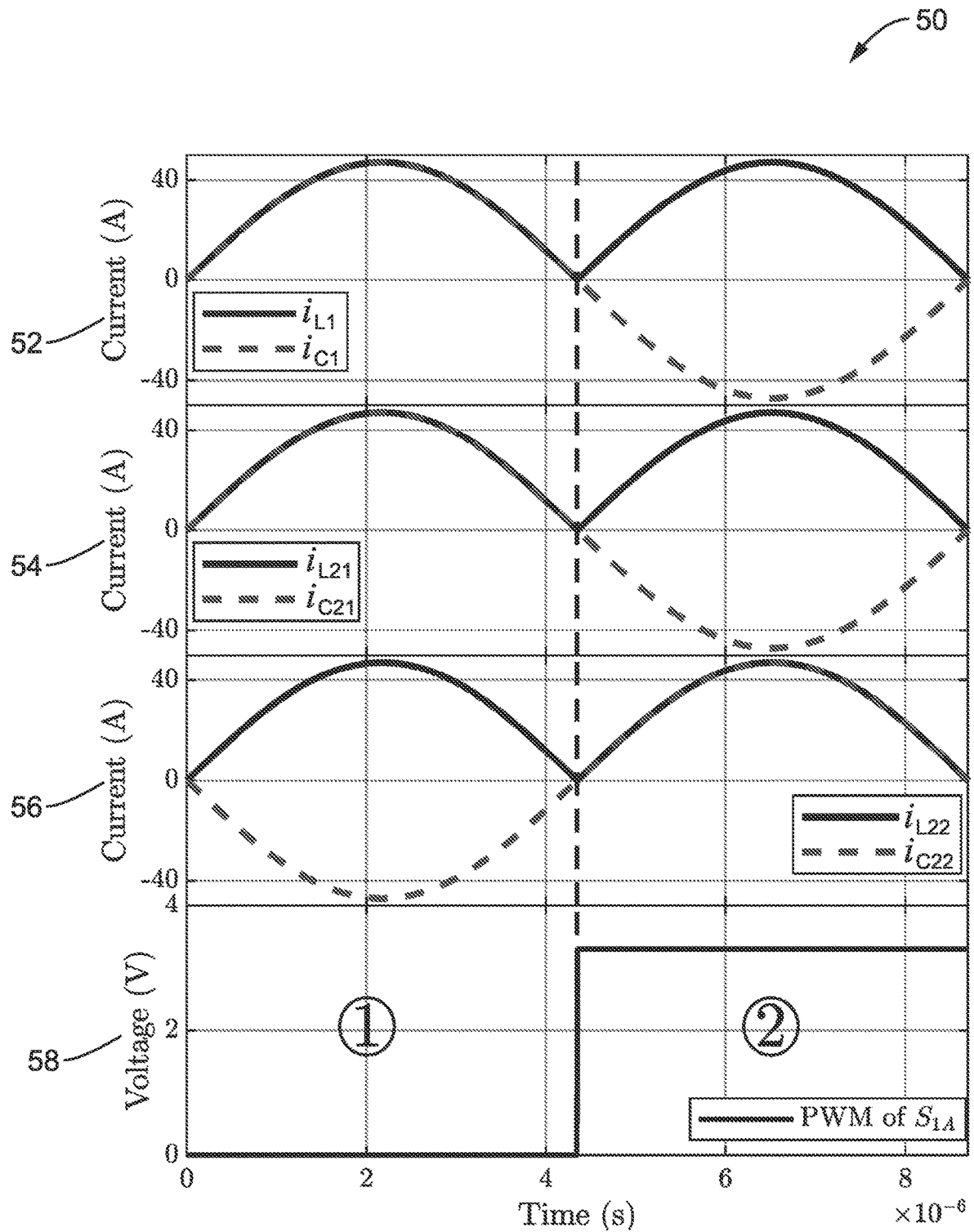
FIG. 3 is a plot of Inductor and flying capacitor current, and voltage drive signals for the 4:1 ReSC converter of FIG. 1, according to at least one embodiment of the present disclosure.

FIG. 3 illustrates an example embodiment 50 of inductor and flying capacitor currents, as well as the Pulse Width Modulation (PWM) of switch $S_{1A}$.

Additionally, since the inductor current 52, 54 and 56 takes the shape of a rectified sine wave, the current reaches zero at moments of phase transitions and Zero Current Switching (ZCS) is achieved when switching at this frequency. Using ZCS switching, losses are eliminated at turnoff and reduced at turn-on. Moreover, Zero Voltage Switching (ZVS) is also achievable by slightly adjusting the deadtime, phase-shift and switching frequency, toward eliminating capacitive turn-on losses. These methods can aid in reducing switching losses associated with the transistor output capacitance, and further improve efficiency under light-loading conditions.

Figure 4:
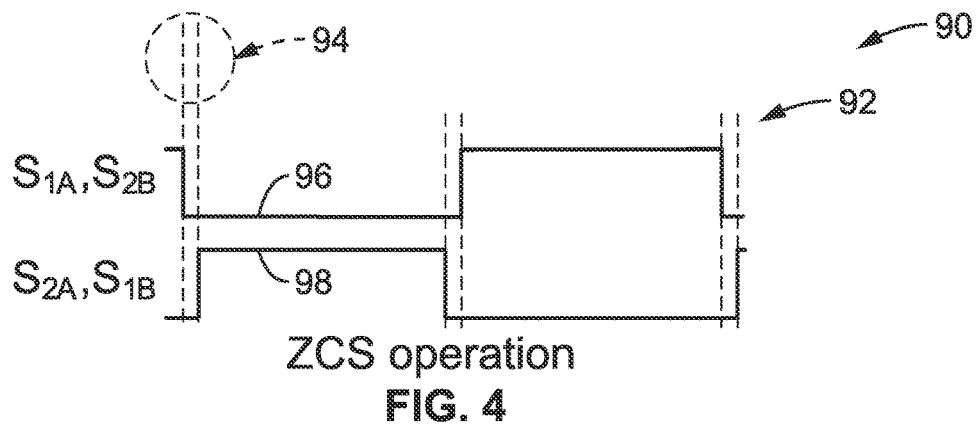
FIG. 4 through FIG. 6 are waveform plots of control signals for different modes of operation for a 2-to-1 element according to at least one embodiment of the present disclosure.
Figure 5:
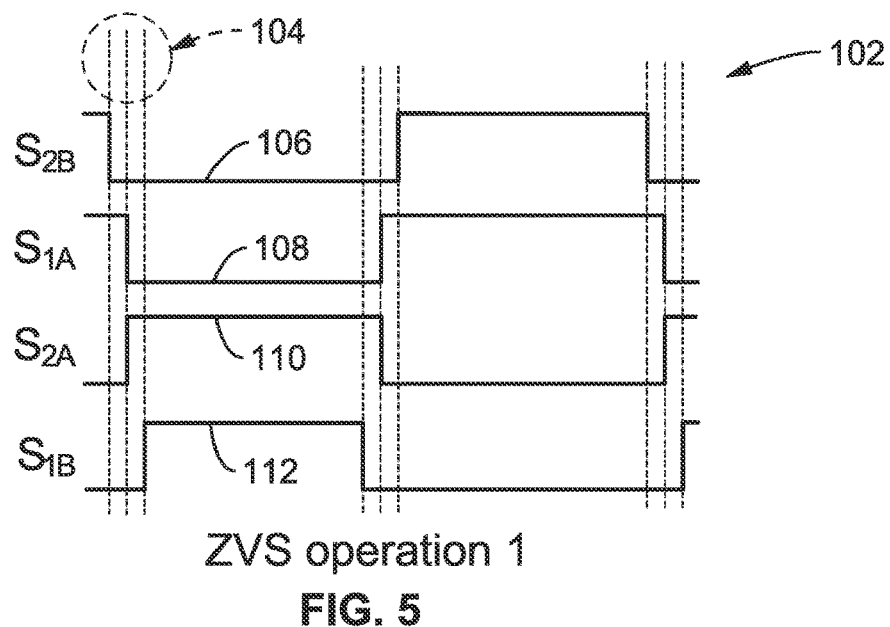
Figure 6:
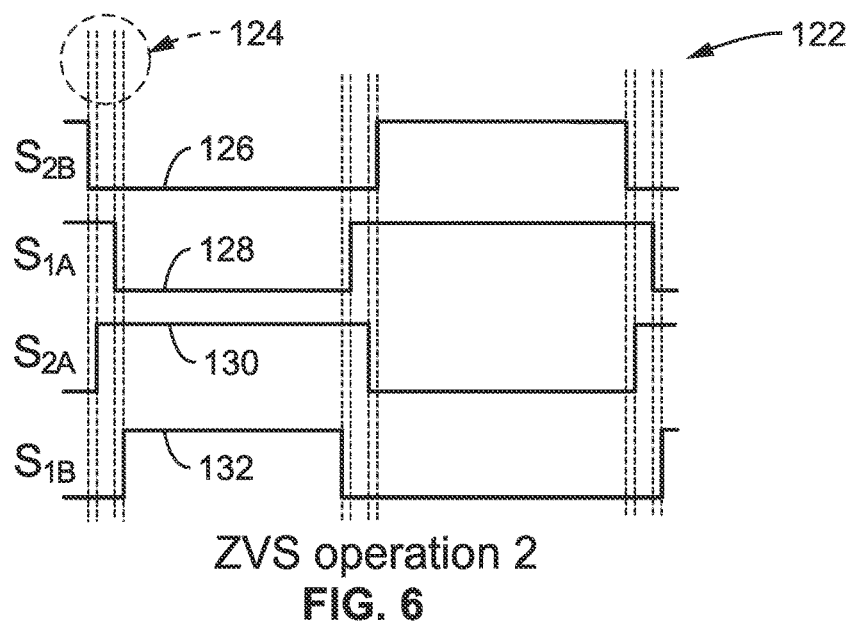

FIG. 4 through FIG. 6 illustrates example embodiments of ZCS 90 and two examples of ZVS 102, 122, switching signals. The following figure provides example switching waveforms for the circuit of FIG. 1. These waveforms are directed to a switching configuration in which active high switching (switch is in conductive state when control input is in a high state). One of ordinary skill in the art will appreciate that waveforms may be inverted for use with circuitry configured for using active low switching without departing from the teachings of the present disclosure.

In the first portion of FIG. 4, a drive (control) signal 98 for $S_{2A}$, $S_{1B}$ is shown going active high while drive signal 96 for $S_{1A}$ and $S_{2B}$ is assured 94 to be in a low inactive state, due to deadtime 94, thus it is made certain that the brief linear periods during switching do not coincide with one another resulting in adverse reverse currents. In the second portion of the switching signal waveforms, drive signals $S_{1A}$ and $S_{2B}$ are switched on, while $S_{2A}$, $S_{1B}$ are assured to be in an off state based on deadtime 94. It will be noted that the switching (drive) signals must be constrained using this deadtime 94 (e.g., use of overlapping non-active state) to assure that both sets of switches are not simultaneously active.

The ZVS operation 102 shown in FIG. 5 has a fixed 50% duty ratio between on and off states for the drive signals for $S_{1A}$ 108 and $S_{2A}$ 110, and the use of overlapping drive signal 106 for $S_{2B}$ with signal 112 for $S_{1B}$. These signals are referred to as overlapped because the inactive (off) state seen in the first portion of signal 106, overlaps (extends beyond the start and end of) the active (on) state for signal 112 because of deadtime 104, and similarly in the second portion of these signals the inactive state of signal 112 extends in both directions beyond that of the active state for drive signal 106, also because of the deadtime 104. It will be seen that the control signals for $S_{1A}$ and $S_{2A}$ comprise fixed 50% duty cycle signaling (no overlap), which can simplify control-signal implementation but may cause unexpected body diode conduction issues.

In FIG. 6 an overlap pattern for deadtime 124 is shown for $S_{1A}$ and $S_{2A}$ drive signals in a mode 2 ZVS operation to realize ZVS completely and minimize body diode conduction. The figure depicts on and off states for $S_{2B}$ driving signal 126, $S_{1A}$ driving signal 128, $S_{2A}$ driving signal 130, $S_{1B}$ driving signal 132.

An ability to reduce necessary $C_{mid}$ capacitance is an effective way to improve power density. One advantage of the interleaving structure of the second stage is cancellation of current ripples at the $V_{mid}$ node, at the $C_{mid}$ capacitance, which allows the circuit to be implemented with a small $C_{mid}$. It should be noted that only the second stages need to be interleaved; the first stage is not required to be interleaved to have this cancellation effect. The resonance between $C_{mid}$ and other passive components, e.g., $C_1$, $L_1$, $C_{21}$, and $L_{21}$, should be avoided to reduce resonant current through $C_{mid}$ and current mismatch between the two stages. A general guideline to select $C_{mid}$ is $C_{mid} \leq 0.9 C_{mid\_crit}$, where $C_{mid\_crit}$ is solved from the resonant condition $$2 f_{sw} = 1 \bigg/ \left( 2\pi \sqrt{\frac{L_1 L_2}{L_1 + L_2} \frac{C_{mid\_crit}(C_1 + C_2)}{C_{mid\_crit} + C_1 + C_2}} \right).$$

Figure 7:
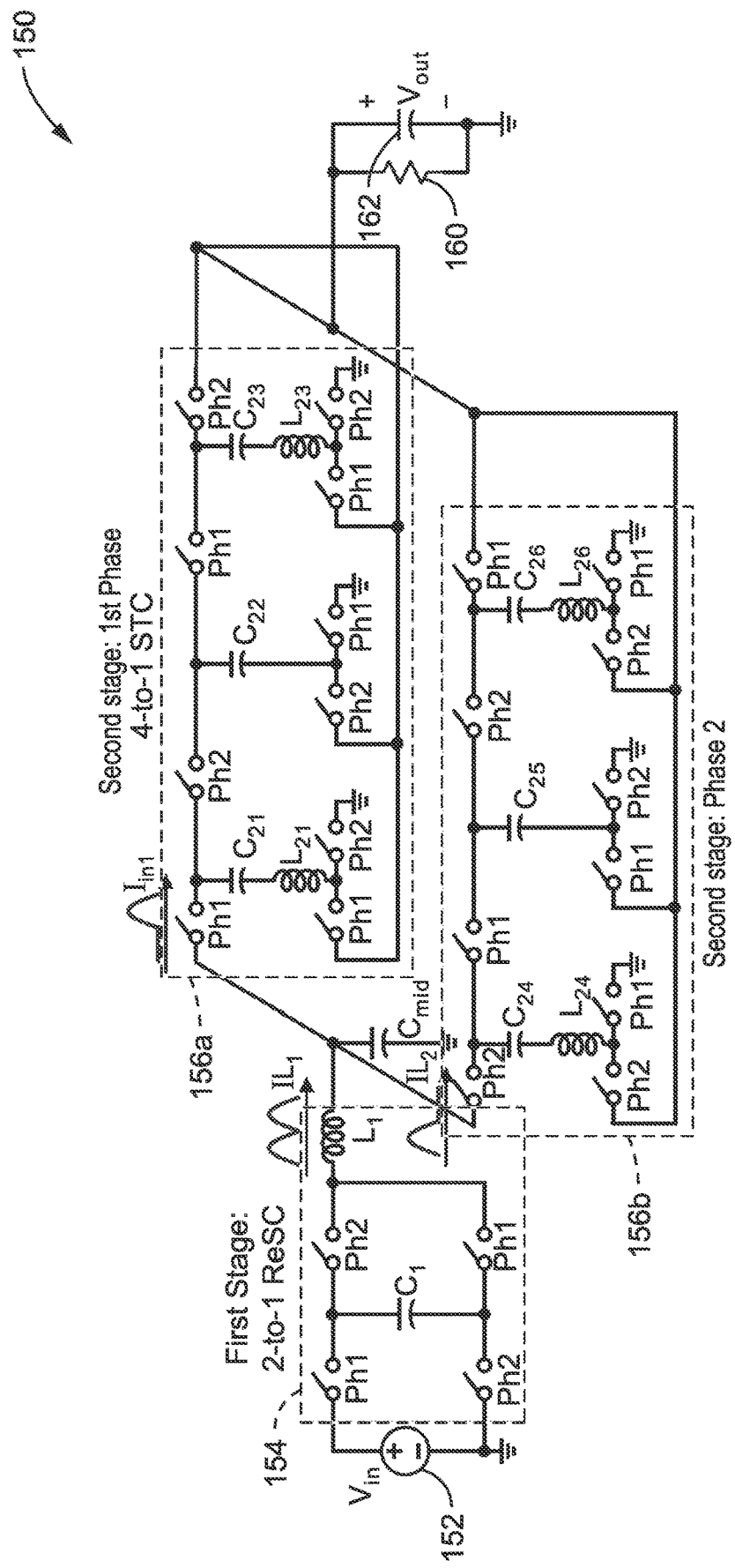
FIG. 7 is a schematic diagram of cascading a multiple phase 4-to-1 STC stage after the first 2-to-1 ReSC stage, according to at least one embodiment of the present disclosure.
Figure 8:
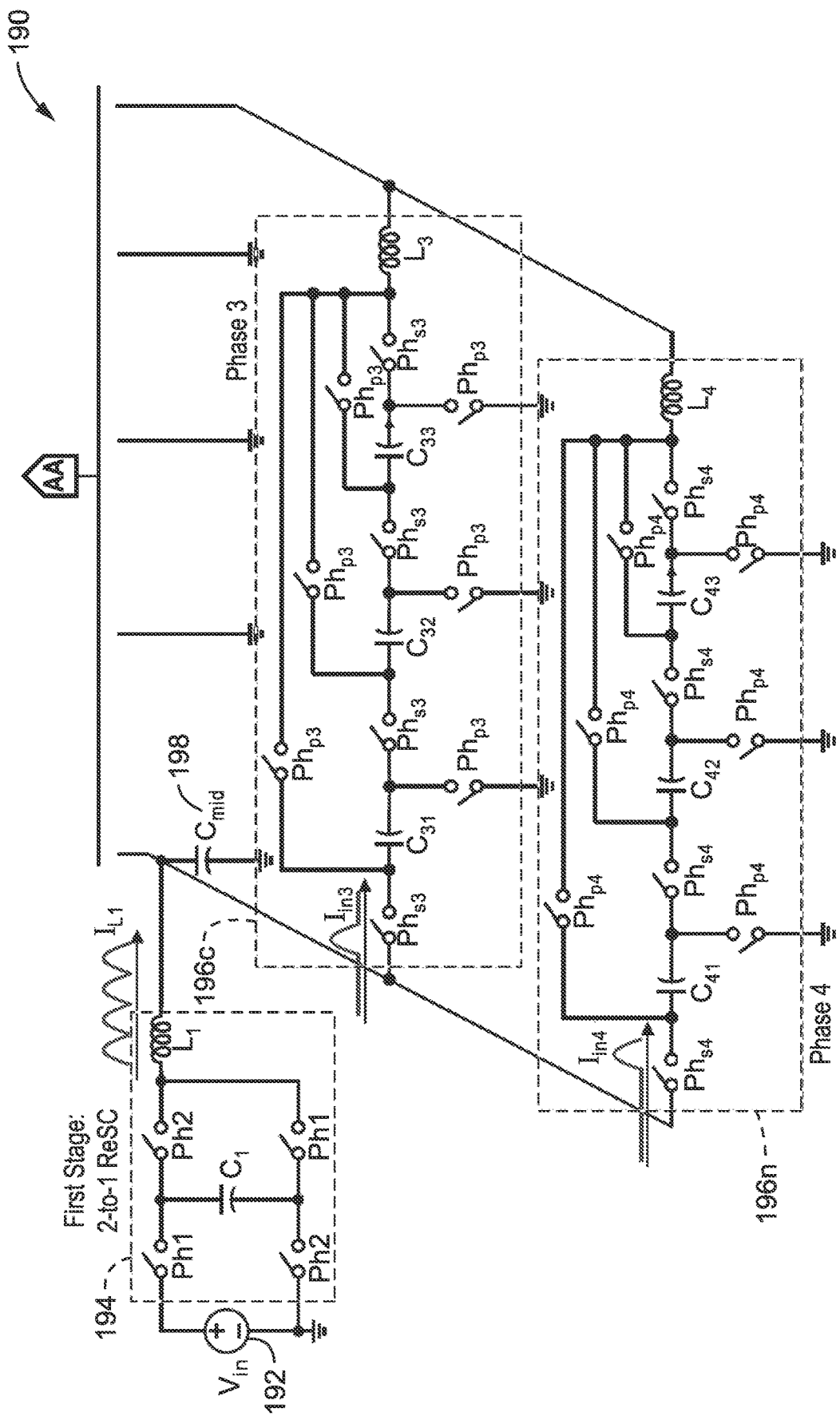
FIG. 8 and FIG. 9 is a schematic diagram of cascading a multiple phase 4-to-1 series-parallel stage after the first 2-to-1 ReSC stage, according to at least one embodiment of the present disclosure.
Figure 9:
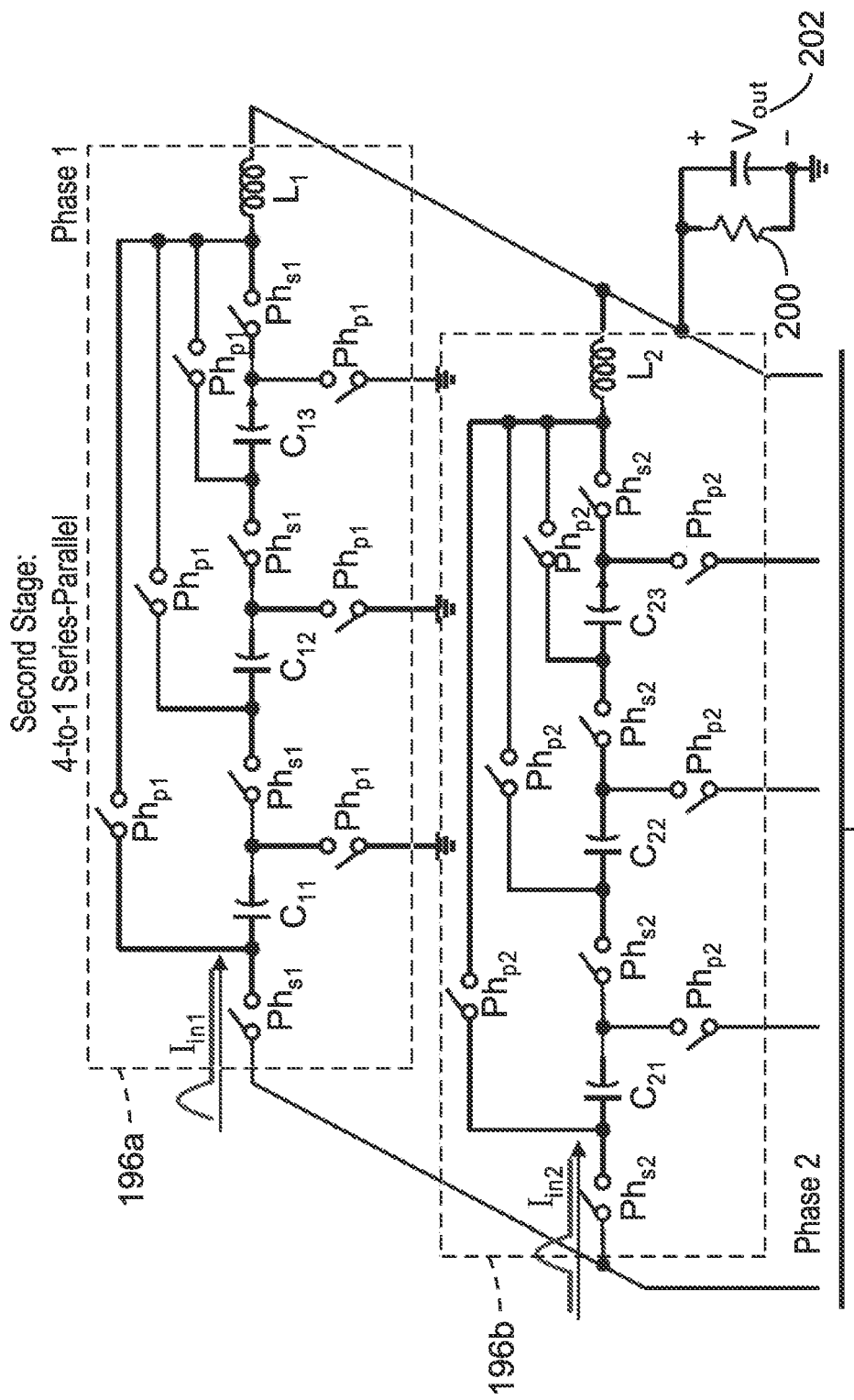
Figure 10:
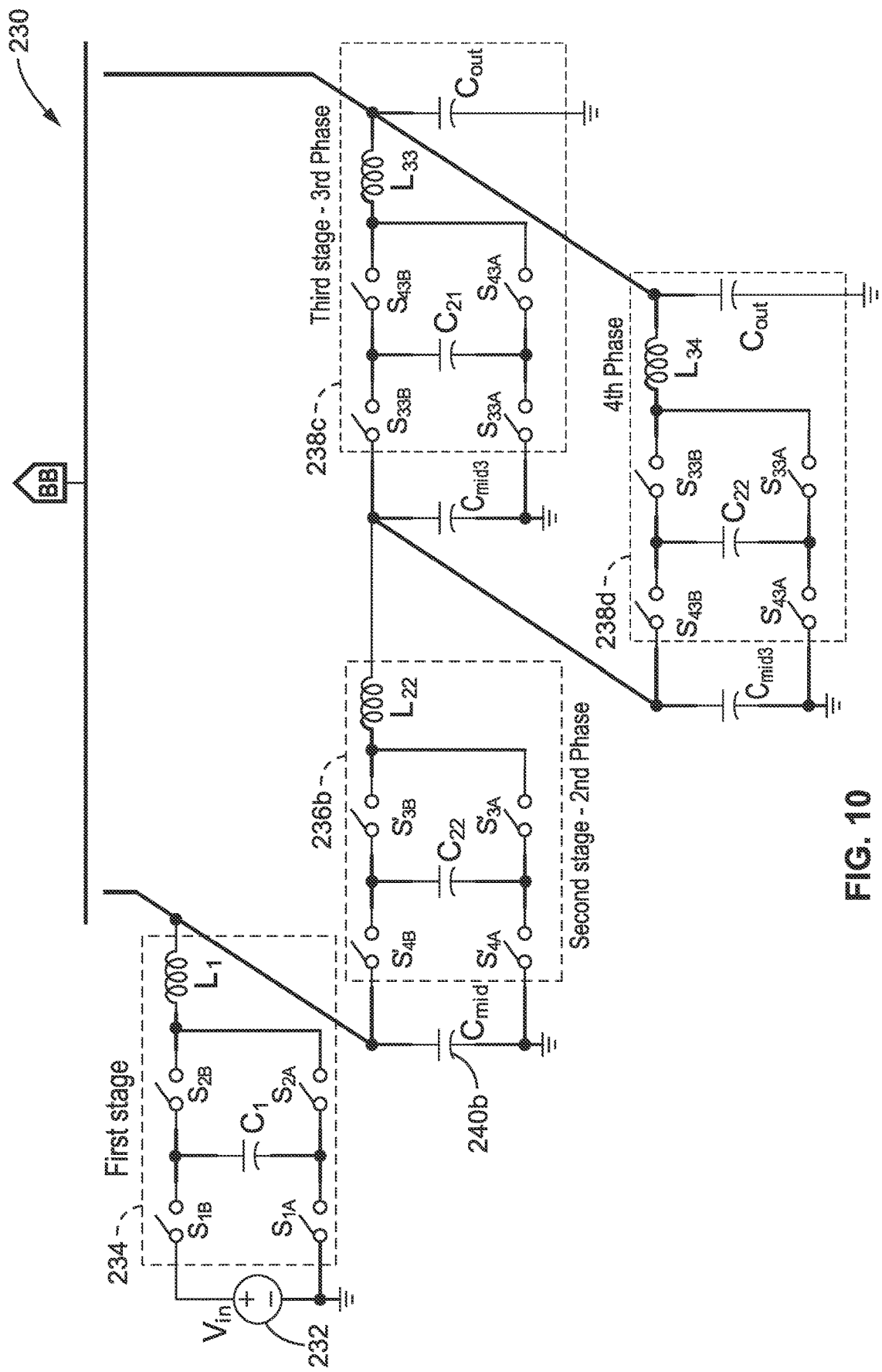
FIG. 10 and FIG. 11 is a schematic diagram of a cascading multiple phases and stages of a 2-to-1 ReSC topology according to at least one embodiment of the present disclosure.
Figure 11:
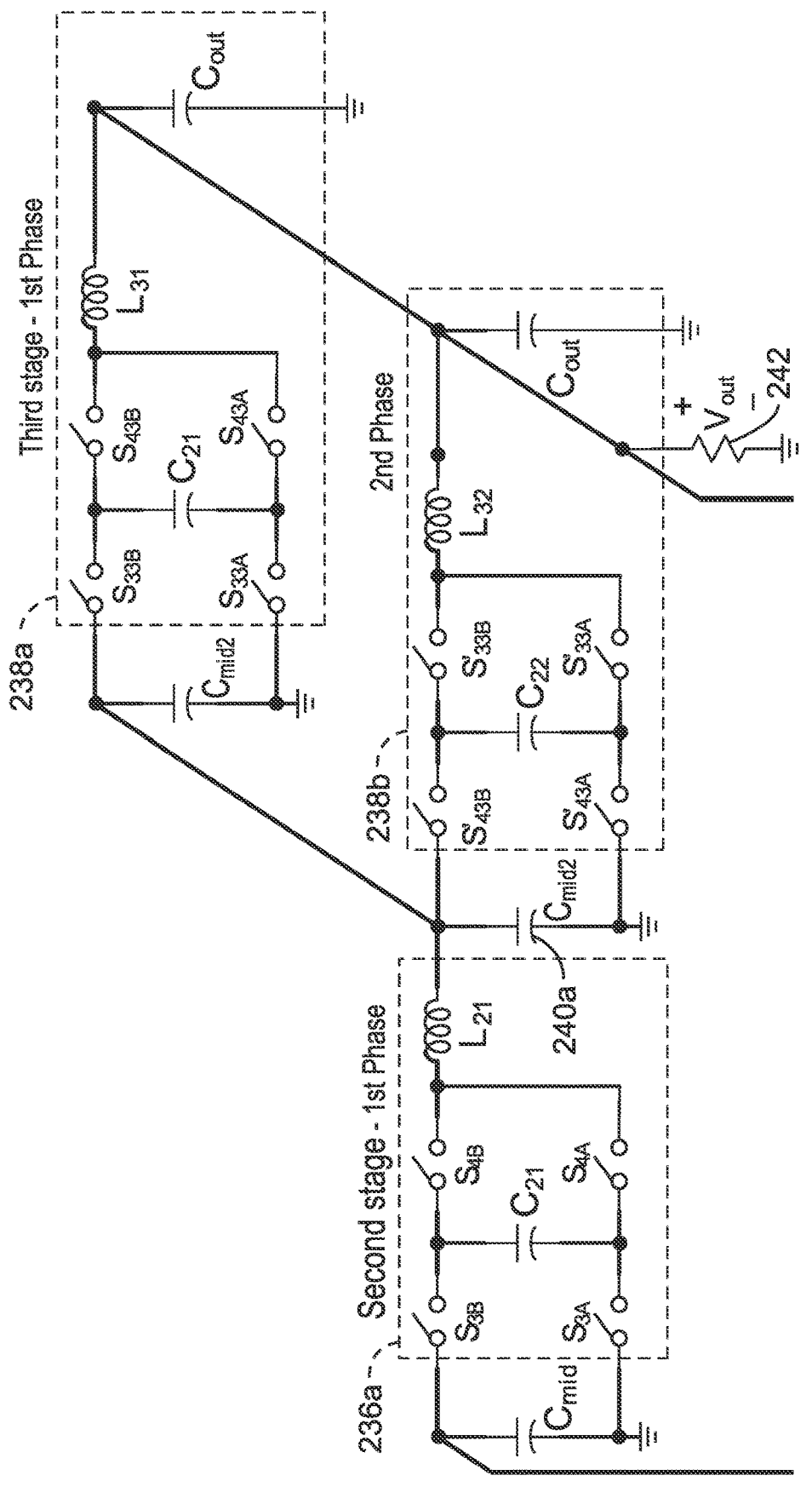

FIG. 7 through FIG. 11 illustrates example embodiments of a cascading 8-to-1 converters 150, 190 and 230 with additional stages exemplified as 4-to-1 STC in FIG. 7, 4-to-1 series-parallel in FIG. 8 through FIG. 9, and multi-stage multi-phases of 2-to-1 ReSC in FIG. 10 through FIG. 11. It should also be appreciated that the structures and operating principles described herein can be extended to numerous variations of these topologies, such as for other conversion ratio and resonant topologies, without departing from the teachings of the present disclosure.

In FIG. 7 an 8-to-1 converter is realized with the ReSC first stage and a stage having two 4-to-1 converter phases.

Power 152 is directed to the first stage 154 implemented here as a 2-to-1 ReSC stage, which is like the first stage of FIG. 1 with its four switches controlled by Ph1 and Ph2, flying capacitance $C_1$ and output inductance $L_1$.

The second stage is shown with a $C_{mid}$ capacitance (between first and second stages) and coupled to two 4-to-1 Switched Tank Converter (STC) phases. In this second stage is seen phase1 156a and phase2 156b circuits, whose output $V_{out}$ converges to a capacitance 162 and load 160.

Each of these second stage circuits is shown with series switching pairs, in this example four positive voltage side switches are seen with a flying capacitor or flying capacitor with inductor, between each series of switches. In the example shown the input and output sides each have a flying LC, exemplified as $C_{21}$ in series with $L_{21}$, and $C_{23}$ in series with $L_{23}$, which is coupled between switches, one connected to the output and the other connected to ground. In the center of this phase of stage 2 is a middle capacitor $C_{22}$ coupled between the positive side switches on one side, with the other side coupled between switches which can selectively connect to the negative output side, and ground alternatively.

It should be noted that each stage can be implemented by multiple parallel circuits using the same converter topology. By operating those parallel circuits in an interleaving manner, their input currents have phase shift, and the sum of them equals the output current of the front stage.

Phase 2 156b of the second stage is exemplified with the same structure as that of phase 1, and is shown with flying elements $C_{24}$ in series with $L_{24}$, $C_{25}$, and $C_{26}$ in series with $L_{26}$, respectively.

In FIG. 8 and FIG. 9, a 8-to-1 converter 190 is shown with power 192 directed to a first stage 194 implemented here as a 2-to-1 ReSC stage, which is like the first stage of FIG. 1 with its four switches controlled by Ph1 and Ph2, flying capacitance $C_1$ and output inductance $L_1$.

A second stage is shown with 4-to-1 series-parallel phases, with phase1 196a, phase2 196b, phase3 196c, and phase4 196d. A set of series switches are shown with capacitors $C_{11}$, $C_{12}$, and $C_{13}$, each controlled by $Ph_{s1}$, are interposed between these switches and connected through $L_1$ to a common output with capacitance 202 and load 200. Three grounding switches are also shown controlled by $Ph_{p1}$. A parallel set of switches is also controlled by $Ph_{p1}$ which are shown connecting from the output back into the circuit preceding each capacitor.

Phase 2 has the same structure as phase 1 and is shown with capacitors $C_{21}$, $C_{22}$, $C_{23}$ and inductor $L_2$. Phase 3 has the same structure as phase 1 and is shown with capacitors $C_{31}$, $C_{32}$, $C_{33}$ and inductor $L_3$. Phase 4 has the same structure as phase 1 and is shown with capacitors $C_{41}$, $C_{42}$, $C_{43}$ and inductor $L_4$.

In FIG. 10 and FIG. 11 is shown a multi-stage cascading 3 stage 8-to-1 converter 230. Power 232 is directed to a first stage 234 implemented here as a 2-to-1 ReSC stage, which is like the first stage of FIG. 1 with its four switches controlled by Ph1 and Ph2, flying capacitance $C_1$ and output inductance $L_1$.

A second stage is shown with a first phase 236a and second phase 236b depicted as 2-to-1 ReSC circuits in the manner of the first stage, and having capacitors $C_{21}$ and $C_{22}$ and inductors $L_{21}$ and $L_{22}$.

The third stage is shown containing four ReSC circuit phases, with a first phase 238a, a second phase 238b, a third phase 238c, and a fourth phase 238d, each of which is a ReSC circuit with two-phase operation. These stages are depicted with capacitors $C_{21}$, $C_{22}$, and inductors $L_{31}$, $L_{32}$, $L_{33}$ and $L_{34}$, directed to a capacitor $C_{out}$ at the output of each phase, and a $V_{out}$ at load 242.

Figure 12:
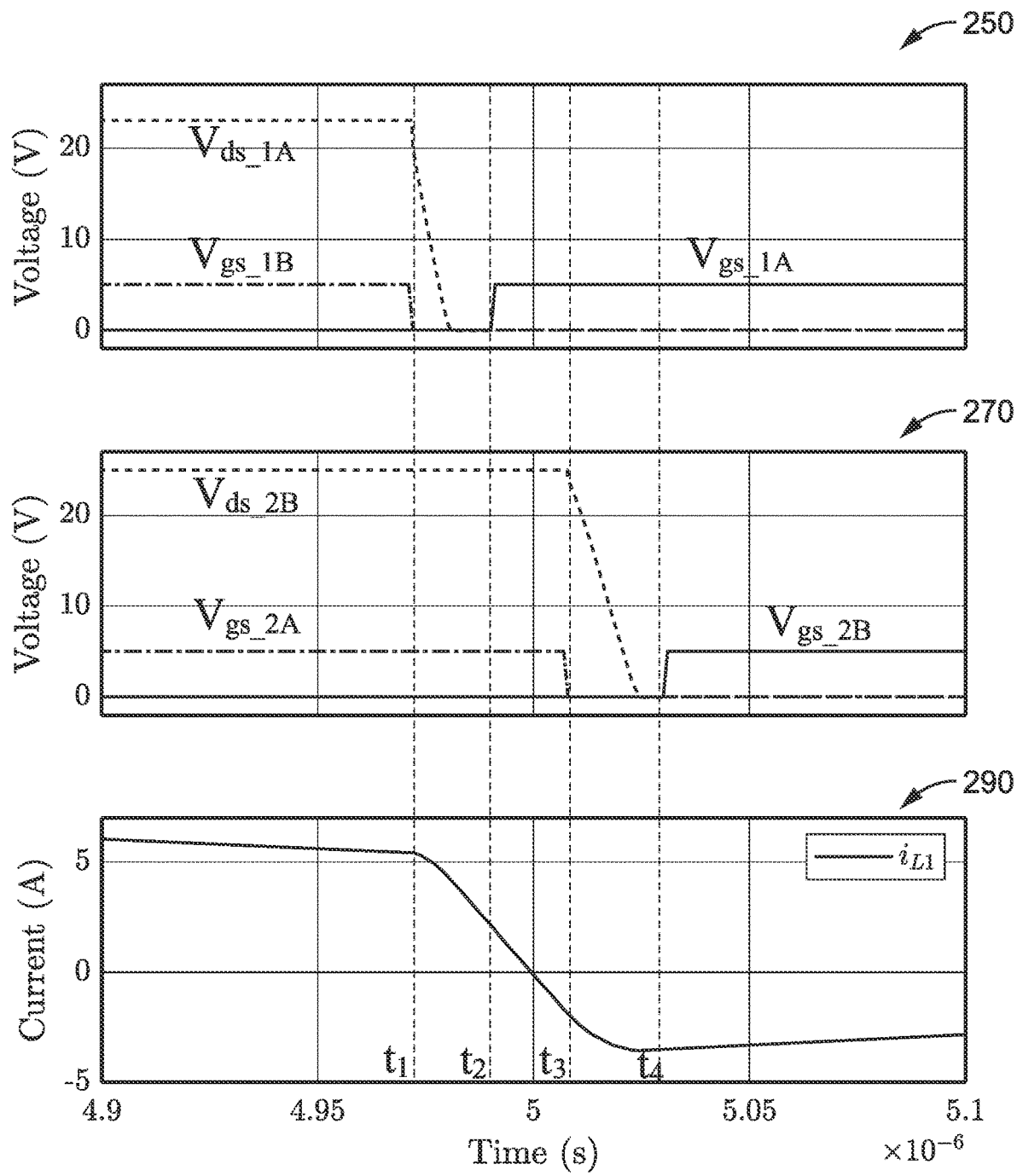
FIG. 12 is a plot of waveform of control signals and inductor current for a 2-to-1 element operating in Zero Voltage Switching (ZVS) mode 2 as utilized according to at least one embodiment of the present disclosure.

FIG. 12 illustrates an example embodiment of Control signals, MOSFET drain-to-source voltages, and inductor current to demonstrate zero voltage switching (ZVS) of $S_{1A}$ and $S_{2B}$ for a 2-to-1 element operating in ZVS mode 2 as shown in FIG. 6. In diagrams 250 and 270 the control signals $V_{gs\_1B}$ and $V_{gs\_2A}$ are shown along with the drain source ($V_{ds\_1A}$, $V_{ds\_2B}$) voltage.

In diagram 290, is depicted the associated current through inductor $L_1$. At time $t_1$, the high-side switch $S_{1B}$ is turned off, and the inductor current $i_{L1}$ is positive. During time period $t_1$ to $t_2$, the positive inductor current $i_{L1}$ discharges the output capacitance ($C_{oss}$) of the low-side switch $S_{1A}$, leading to the voltage decrease of $V_{ds\_1A}$. At $t_2$, the switch $S_{1A}$ is turned on with zero voltage ($V_{ds\_1A}$=0 V). During time period $t_2$ to $t_3$, both the low-side switches $S_{1A}$ and $S_{2A}$ are ON, and the inductor current $i_{L1}$ continues decreasing. At time $t_3$, the low-side switch $S_{2A}$ is turned off, and the inductor current $i_{L1}$ is negative. During $t_3$ to $t_4$, the negative inductor current $i_{L1}$ discharges the $C_{oss}$ of $S_{2B}$. After the drain-to-source voltage $V_{ds\_2B}$ drops to zero, the high-side switch $S_{2B}$ is turned on with ZVS at time $t_4$.

Figure 13:
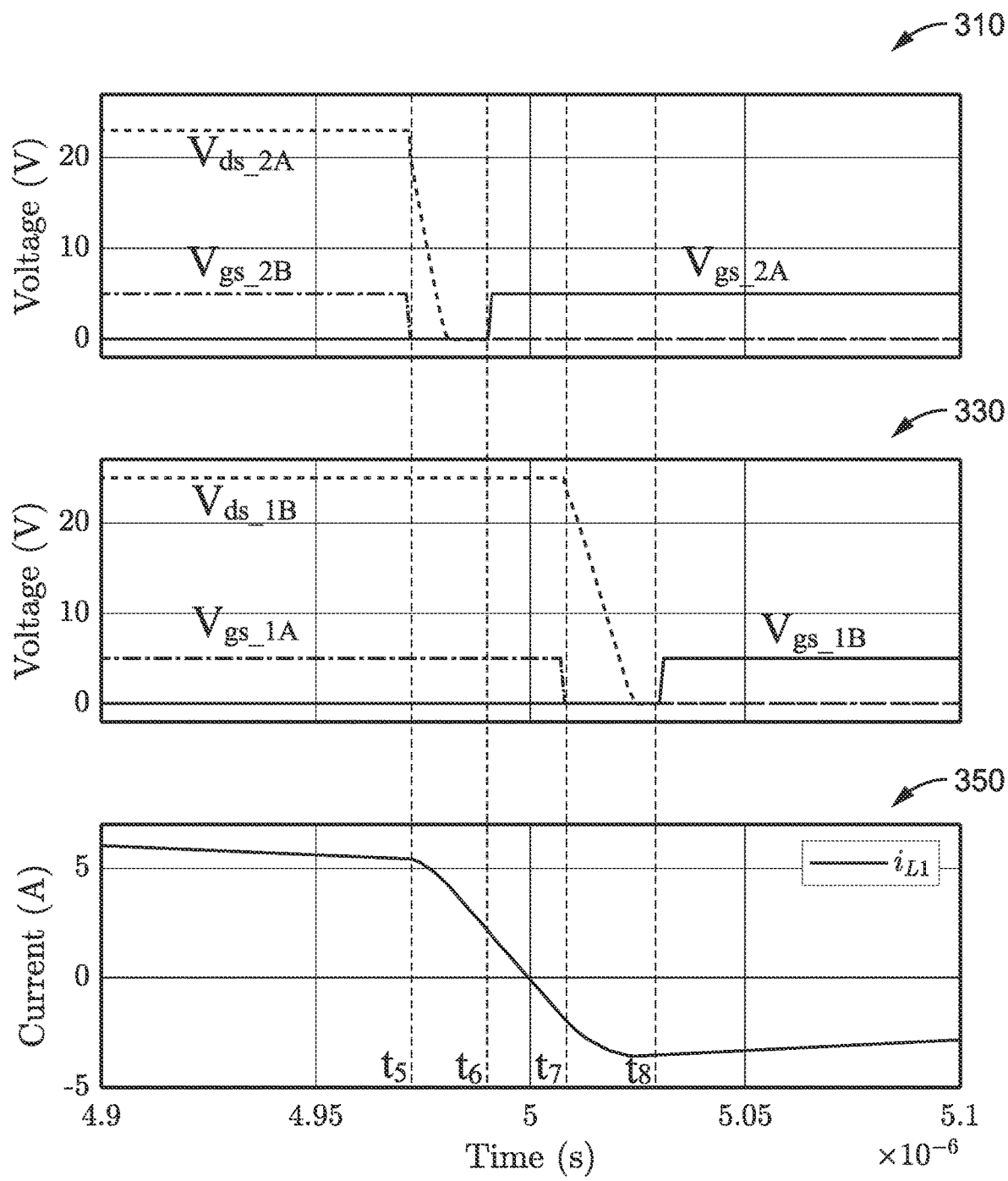
FIG. 13 is a plot of control signals, MOSFET drain-to-source voltages, and inductor currents for demonstrating Zero Voltage Switching (ZVS) of switches S2A and S1B, as utilized according to at least one embodiment of the present disclosure.

FIG. 13 illustrates an example embodiment 310, 330 and 350 of control signals, MOSFET drain-to-source voltages, and inductor current to demonstrate zero voltage switching (ZVS) of $S_{2A}$ and $S_{1B}$. In diagrams 310 and 330, the control signals $V_{gs\_2B}$ and $V_{gs\_1A}$ are shown along with the drain source ($V_{ds\_2A}$, $V_{ds\_1B}$) voltage; while diagram 350 shows the current flow through inductor $L_1$. The switches $S_{2A}$ and $S_{1B}$ can also achieve ZVS, in a similar manner as $S_{1A}$ and $S_{2B}$ as depicted in FIG. 12.

Figure 14:
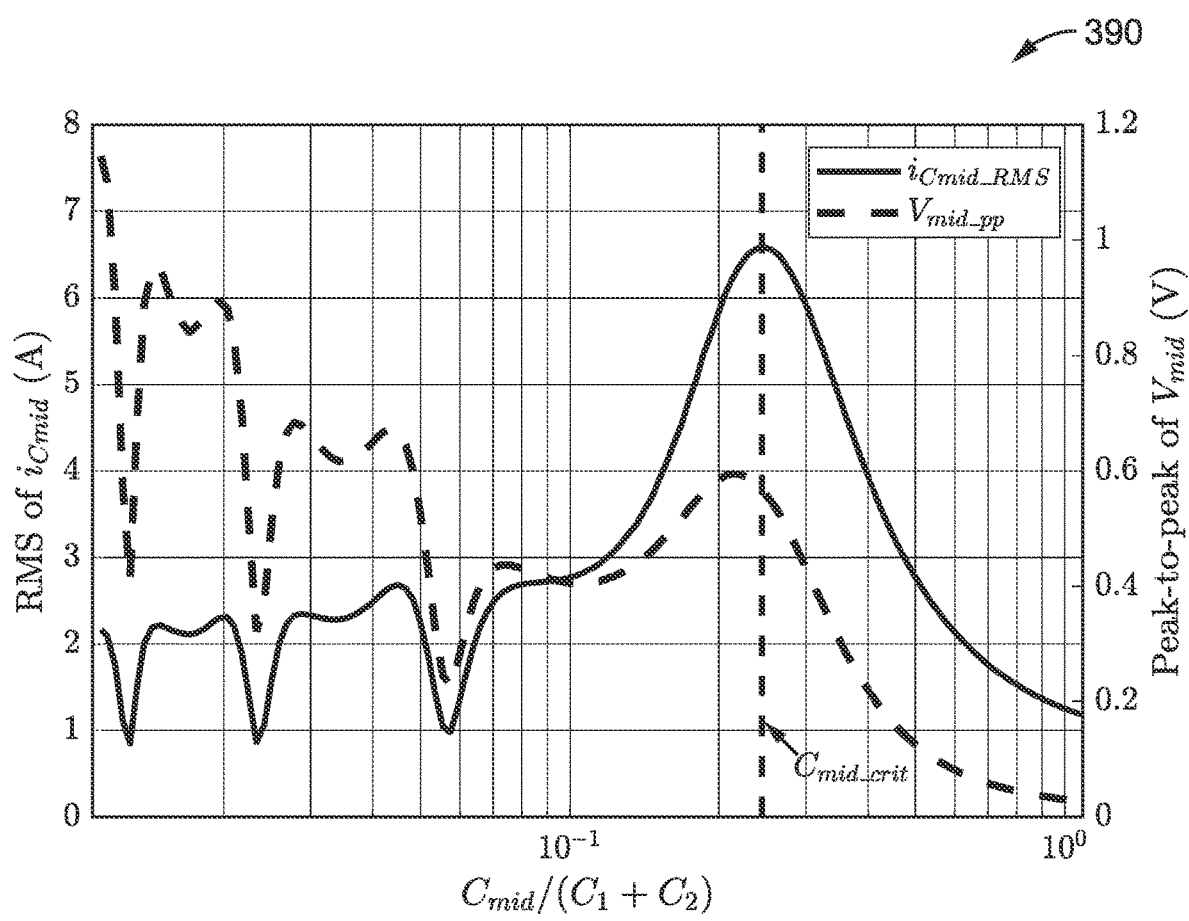
FIG. 14 is a plot of RMS Current and peak-to-peak voltage of $C_{mid}$ to guide selection of $C_{mid}$ capacitance, according to at least one embodiment of the present disclosure.

FIG. 14 illustrates an example embodiment 390 of RMS current ($I_{Cmid\_RMS}$) and peak-to-peak voltage ($V_{mid\_pp}$) toward guiding the selection of $C_{mid}$ capacitance. The capacitor $C_{mid}$ should be selected carefully to improve system efficiency and power density. Although the interleaving cancelling effect on $V_{mid}$ greatly reduces the current ripple of $i_{Cmid}$, the capacitor $C_{mid}$ cannot be omitted since two stages always have a certain mismatch in reality, and their mismatched current needs to flow through $C_{mid}$. It is also necessary to have a certain $C_{mid}$ as the decoupling capacitor for the second-stage MOSFETs. Thus, the present disclosure provides interoperative elements which must be closely balanced to achieve the performance gains of the circuit.

As shown in the figure, the minimum $C_{mid}$ is determined by the voltage ripple requirement of $V_{mid}$. It should also be noticed that the resonant point $C_{mid\_crit}$ is undesired since it causes large resonant current through $C_{mid}$. One can select the capacitance value to be either lower or higher than the resonance point $C_{mid\_crit}$, to achieve small resonant currents. In order to reduce the capacitor size and improve power density, a small $C_{mid}$ is preferred, and a $C_{mid}$ value less than 0.9 $C_{mid\_crit}$ is recommended.

Figure 15:
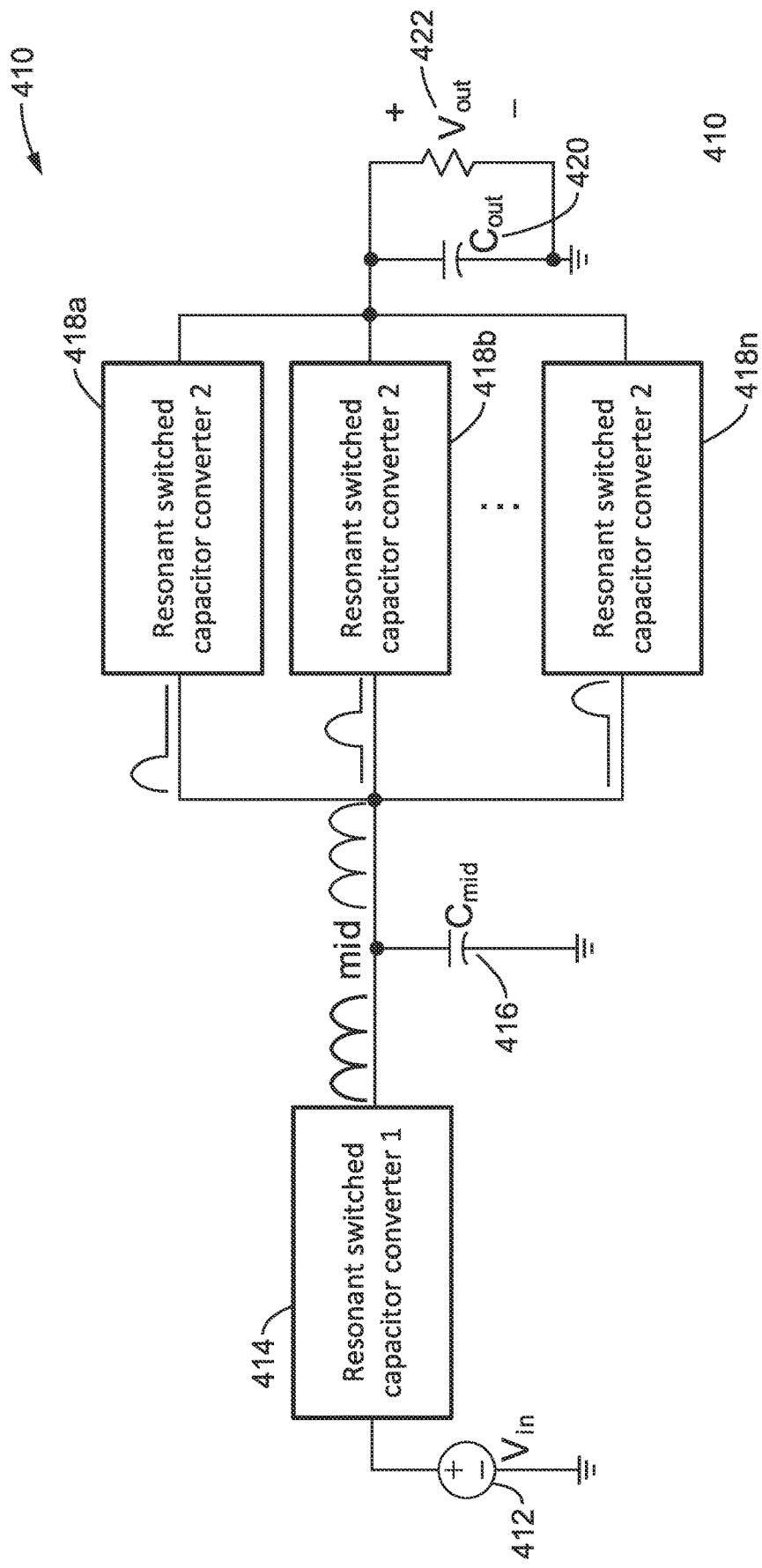
FIG. 15 is a block diagram of a general cascaded resonant switched-capacitor converter architecture, according to at least one embodiment of the present disclosure.

FIG. 15 illustrates an example embodiment 410 of a general cascaded resonant switched-capacitor interleaved converter architecture according to the present disclosure. A voltage source $V_{in}$ 412 is shown being input to a first stage 414 which is exemplified as a ReSC circuit having a continuous rectified sine output current to a capacitance $C_{mid}$ 416. From $C_{mid}$ 416, is seen coupled a second stage comprising multiple phases, depicted as phases 418a, 418b through to 418n). In at least one embodiment these circuits may comprise multiple phases of ReSC modules configured with an interleaving operation. Each module has a pulsed rectified sine output, which is seen here directed to an output capacitance 420 and load 422.

The output side is connected to a C-R load in the example embodiment 410, however, it should be understood that the circuitry of the present disclosure can be connected to different types of dc loads, such as current source(s), battery(s), other circuitry, and so forth without departing from the teachings of the present disclosure. Due to the interleaving operation, the total input current of the second stage is a continuous rectified sine current and equals the first-stage output current. Therefore, the middle capacitor $C_{mid}$ sees a cancelled current ripple and allows small capacitance to be used.

3. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A cascaded resonant switched-capacitor converter apparatus, comprising: (a) a first stage circuit having an input; (b) at least one second stage circuit having an output; (c) an intermediate capacitor, $C_{mid}$, between the first stage circuit and said at least one second stage circuit; (d) wherein said first stage circuit and said at least one second stage circuit are multiple stages of resonant converters coupled in an interleaving manner so that the input current of the second stage matches the output current of the first stage, thereby reducing intermediate capacitor $C_{mid}$ requirements.

A cascaded resonant switched-capacitor converter apparatus, comprising: (a) a first stage circuit having an input directed to a resonant capacitance through switches, and which is connected through switching to an inductance at a first stage output, wherein said capacitance and inductance operate as a first LC tank circuit of the resonant switched-capacitor matrix; (b) wherein said first stage comprises a single phase circuit, having a first half cycle of the period in which switches are activated for charging said first LC tank circuit, while in a second half cycle of the period, said first LC tank circuit is discharged into a subsequent stage; (c) circuitry of at least one subsequent stage, which receives input from a preceding stage, each one of said at least one subsequent stages contains multiple circuit phases; (d) wherein each circuit phase of each of said at least one subsequent stage is configured with switches configured for switching power to and from one or more capacitances, or capacitances and inductances, for charging tank circuitry of this circuit phase from its input and discharging tank circuitry of this circuit phase into an output which drives a load, or a subsequent circuit stage; and (e) wherein said multiple circuit phases improve current-handling capability of their associated stage, since each circuit phase handles a portion of the total current load, and wherein each of said multiple circuit phases has a resonant frequency which matches that of said first stage; and (f) wherein each circuit phase of each of said at least one subsequent stage is configured for receiving power from a specific output waveform phase from the preceding circuit stage and interleaving outputs with that of the other circuit phases into the output from this same stage.

A cascaded resonant switched-capacitor converter apparatus, comprising: a first stage comprising a single-phase 2-to-1 resonant switched-capacitor (ReSC) circuit; a second stage comprising two phases of interleaved 2-to-1 ReSC circuitry to realize a total 4-to-1 conversion ratio; wherein outputs from the switching paths of said first stage are coupled through an inductance for coupling to an intermediate capacitance $C_{mid}$ in said second stage; and wherein said second stage has said two phases operating in an interleaved manner in which input current to said second stage matches output current from said first stage, thereby eliminating requirements for a larger intermediate capacitance $C_{mid}$ to completely decouple the first stage and second stage thereby reducing passive volume while maintaining circuit performance.

A cascaded resonant switched-capacitor converter apparatus, comprising: a basic structure of cascaded resonant switched-capacitor converter with 4-to-1 conversion ratio; a first stage comprising four switches, one resonant capacitor, and one resonant inductor; a second stage comprising eight switches, two resonant capacitors, and two resonant inductors; and Intermediate capacitor between the first stage and second stage, Cmid, capacitance.

The apparatus of any preceding implementation, wherein the apparatus provides a 4-to-1 conversion ratio between a voltage input and an output voltage.

The apparatus of any preceding implementation, wherein the second stage circuit comprises two phases of interleaved circuitry.

The apparatus of any preceding implementation, wherein the first stage circuit comprises a single-phase 2-to-1 resonant switched-capacitor (ReSC) circuit and wherein the second stage circuit comprises two phases of interleaved 2-to-1 ReSC circuitry to realize a total 4-to-1 conversion ratio.

The apparatus of any preceding implementation, wherein the apparatus has a first resonant state and a second resonant state.

The apparatus of any preceding implementation, wherein the first stage circuit and the second stage circuit are resonant at a same resonant frequency.

The apparatus of any preceding implementation, wherein said apparatus has a switching frequency that is equal to or greater than the resonant frequency.

The apparatus of any preceding implementation, wherein each switch can realize zero current switching by using a ZCS control signal scheme.

The apparatus of any preceding implementation, wherein the intermediate capacitor $C_{mid}$ does not participate in circuit resonance.

The apparatus of any preceding implementation, wherein said at least one subsequent stage comprises two phases of 4-to-1 switched tank converter (STC), wherein the overall conversion ratio is 8 to 1.

The apparatus of any preceding implementation, wherein said at least one subsequent stage comprises a second stage having four phases of 4-to-1 series-parallel phases, wherein the overall conversion ratio is 8 to 1.

The apparatus of any preceding implementation, wherein said at least one subsequent stage comprises a second and third stage of multiple phases.

The apparatus of any preceding implementation, wherein said second stage comprises two phases.

The apparatus of any preceding implementation, wherein said third stage comprises four phases.

The apparatus of any preceding implementation, wherein switches of said switched-capacitor converter apparatus comprise metal oxide semiconductor field effect transistors (MOSFETs).

The apparatus of any preceding implementation, wherein switches of said switched-capacitor converter apparatus operate from one switching frequency and a 50% duty cycle.

The apparatus of any preceding implementation, wherein said first stage is configured to receive a power input which is directed to a switched capacitor matrix having a first pair of parallel switches coupled from each side of the positive input to each side of a first capacitance, and a second pair of switches coupled from each side of said first capacitance to an inductor at the output of said first stage; and wherein said first capacitance and said inductor form an LC tank circuit which is alternately charged and discharged on each half cycle of a switching frequency for said apparatus.

The apparatus of any preceding implementation, wherein said second stage comprises two phases of the first stage circuitry, in which the input has a capacitance $C_{mid}$, and each output has a capacitance $C_{out}$, with outputs from said two phases being coupled together for driving a converter output $V_{out}$.

The apparatus of any preceding implementation, wherein an interleaving operation is performed at the second-stage.

The apparatus of any preceding implementation, wherein said second stage has two resonant states.

The apparatus of any preceding implementation, wherein the resonant frequency of the first stage and second stage are the same, $$f_r = \frac{1}{2\pi\sqrt{L_1 C_1}} = \frac{1}{2\pi\sqrt{L_2 C_2}}.$$

The apparatus of any preceding implementation, wherein switching frequency equals or is higher than the resonant frequency $f_r$.

The apparatus of any preceding implementation, All switches can realize zero current switching by using the proposed ZCS control signal scheme.

The apparatus of any preceding implementation, wherein all switches can realize zero voltage switching by using the proposed ZVS control signal scheme.

The apparatus of any preceding implementation, wherein capacitance $C_{mid}$ does not participate in the resonance: $C_{mid} \leq 0.9 C_{mid\_crit}$ or $C_{mid} \geq 1.1 C_{mid\_crit}$, $C_{mid\_crit}$ is solved from $$2f_{sw} = 1 \bigg/ \left(2\pi \sqrt{\frac{L_1 L_2}{L_1 + L_2} \frac{C_{mid\_crit}(C_1 + C_2)}{C_{mid\_crit} + C_1 + C_2}}\right).$$

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A cascaded resonant switched-capacitor converter apparatus, comprising:
   (a) a single first stage circuit having an input directed through a first set of switches to a capacitance, which is connected through a second set of switches through an inductor as an output of the first stage;
   (b) at least one second stage circuit comprising two or more resonant switched capacitor converters, each having switches on either side of a charge storage element, and whose outputs are merged as an output of the apparatus;
   (c) an intermediate capacitor, $C_{mid}$, between the first stage circuit and said at least one second stage circuit; and
   (d) wherein said first stage circuit and said at least one second stage circuit are multiple stages of resonant converters coupled in an interleaving manner so that the input current of the second stage matches the output current of the first stage, which means that the value of capacitance of $C_{mid}$ does not provide complete decoupling of the first stage and second stage thereby reducing $C_{mid}$ capacitance value requirements and reducing capacitance volume, while maintaining circuit performance; and
   (e) wherein drive signals are generated to control the state of the switches in the first stage and second stage of conversion, and wherein these signals are constrained by a time delays to create an overlapping non-active state to assure that both first switches are not simultaneously active, and that both second switches are not simultaneously active.

2. A cascaded resonant switched-capacitor converter apparatus, comprising:
(a) a single first stage circuit having an input directed to a resonant capacitance through switches, a first set of switches on a first side of the resonant capacitor and a second set of switches on a second side of the resonant capacitor, and which is connected through switching to an inductance at a first stage output, wherein said capacitance and inductance operate as a first LC tank circuit of the resonant switched-capacitor matrix;
(b) wherein said first stage comprises a single phase circuit, having a first half cycle of the period in which switches are activated for charging said first LC tank circuit, while in a second half cycle of the period, said first LC tank circuit is discharged into a subsequent stage;
(c) circuitry of at least one subsequent stage comprising at least two converters, which receives input from a preceding stage, each one of said at least one subsequent stage containing multiple circuit phases which are interleaved;
(d) wherein each circuit phase of each of said at least one subsequent stage is configured with switches configured for switching power to and from one or more capacitances, or capacitances and inductances, for charging tank circuitry of this circuit phase from its input and discharging tank circuitry of this circuit phase into an output which drives a load, or a subsequent circuit stage, wherein said first LC tank circuit is alternately coupled between a tank circuit in a first of the multiple circuit phases, and a tank circuit in a second of the multiple circuit phase which provides interleaving of these circuit phases; and
(e) wherein said multiple circuit phases improve current-handling capability of their associated stage, since each circuit phase handles a portion of the total current load, and wherein each of said multiple circuit phases has a resonant frequency which matches that of said first stage;
(f) wherein each circuit phase of each of said at least one subsequent stage is configured for receiving power from a specific output waveform phase from the preceding circuit stage and interleaving outputs with that of the other circuit phases into the output from this same stage; and
(g) wherein drive signals are generated to control the state of the switches in the first stage and second stage of conversion, and wherein these signals are constrained by time delays to create an overlapping non-active state to assure that both first switches are not simultaneously active, and that both second switches are not simultaneously active.

3. The apparatus of claim 2, wherein the apparatus provides a 4-to-1 conversion ratio between a voltage input and an output voltage, or can be operated in the reverse direction for voltage step-up.

4. The apparatus of claim 2, wherein the second stage circuit comprises two phases of interleaved circuitry.

5. The apparatus of claim 2, wherein the first stage circuit comprises a single-phase 2-to-1 resonant switched-capacitor (ReSC) circuit and wherein the second stage circuit comprises two phases of interleaved 2-to-1 ReSC circuitry to realize a total 4-to-1 conversion ratio.

6. The apparatus of claim 2, wherein the apparatus has a first resonant state and a second resonant state.

7. The apparatus of claim 2, wherein the first stage circuit and the second stage circuit are resonant at a same resonant frequency.

8. The apparatus of claim 2, wherein said apparatus has a switching frequency that is equal to or greater than the resonant frequency.

9. The apparatus of claim 2, wherein each switch can realize zero current switching by using a ZCS control signal scheme.

10. The apparatus of claim 2, wherein the intermediate capacitor $C_{mid}$ does not participate in circuit resonance.

11. The apparatus of claim 2, wherein said at least one subsequent stage comprises two phases of 4-to-1 switched tank converter (STC), wherein the overall conversion ratio is 8 to 1.

12. The apparatus of claim 2, wherein said at least one subsequent stage comprises a second stage having four phases of 4-to-1 series-parallel phases, wherein the overall conversion ratio is 8 to 1, or can be operated in the reverse direction for voltage step-up.

13. The apparatus of claim 2, wherein said at least one subsequent stage comprises a second and third stage of multiple phases.

14. The apparatus of claim 13, wherein said second stage comprises two phases.

15. The apparatus of claim 14, wherein said third stage comprises four phases.

16. A cascaded resonant switched-capacitor converter apparatus, comprising:
(a) a first stage comprising a single-phase 2-to-1 resonant switched-capacitor (ReSC) circuit having an input directed through a first set of switches to a capacitance, which is connected through a second set of switches through an inductor as an output of the first stage;
(b) a second stage comprising two phases of interleaved 2-to-1 ReSC circuitry to realize a total 4-to-1 conversion ratio comprising two or more resonant switched capacitor converters, each having switches on either side of a charge storage element, and whose outputs are merged as an output of the apparatus;
(c) wherein outputs from the switching paths of said first stage are coupled through an inductance for coupling to an intermediate capacitance $C_{mid}$ in said second stage;
(d) wherein said second stage has said two phases operating in an interleaved manner in which input current to said second stage matches output current from said first stage, thereby eliminating requirements for a larger intermediate capacitance $C_{mid}$ to completely decouple the first stage and second stage thereby reducing $C_{mid}$ capacitance value requirements and associated capacitance volume, while maintaining circuit performance; and
(e) wherein drive signals are generated to control the state of the switches in the first stage and second stage of conversion, and wherein these signals are constrained by time delays to create an overlapping non-active state to assure that both first switches are not simultaneously active, and that both second switches are not simultaneously active.

17. The apparatus of claim 16, wherein switches of said switched-capacitor converter apparatus comprise metal oxide semiconductor field effect transistors (MOSFETs).

18. The apparatus of claim 16, wherein switches of said switched-capacitor converter apparatus operate from one switching frequency and a 50% duty cycle.

19. The apparatus of claim 16, wherein said first stage is configured to receive a power input which is directed to a switched capacitor matrix having a first pair of parallel switches coupled from each side of the positive input to each side of a first capacitance, and a second pair of switches coupled from each side of said first capacitance to an inductor at the output of said first stage; and wherein said first capacitance and said inductor form an LC tank circuit which is alternately charged and discharged on each half cycle of a switching frequency for said apparatus.

20. The apparatus of claim 16, wherein said second stage comprises two phases of the first stage circuitry, in which the input has a capacitance $C_{mid}$, and each output has a capacitance $C_{out}$, with outputs from said two phases being coupled together for driving a converter output $V_{out}$.

21. The apparatus of claim 16, wherein the apparatus has a switching frequency that is equal to or greater than the resonant frequency.

22. The apparatus of claim 16, wherein each switch can realize zero current switching by using zero voltage switching (ZVS) in a ZCS control signal scheme.

23. The apparatus of claim 16, wherein each switch can realize zero voltage switching (ZVS) by using a ZVS control signal scheme.

* * * * *